United States Patent [19]

Yntema et al.

[11] Patent Number: 5,757,629
[45] Date of Patent: May 26, 1998

[54] SWITCHED-MODE POWER SUPPLY WITH COMPENSATION FOR VARYING INPUT VOLTAGE

[75] Inventors: Johannes Yntema; Schelte Heeringa; Wilhelmus G. M. Ettes. all of Drachten, Netherlands

[73] Assignee: U.S. Philips Corporation. New York, N.Y.

[21] Appl. No.: 795,818

[22] Filed: Feb. 6, 1997

[30] Foreign Application Priority Data

Feb. 12, 1996 [EP] European Pat. Off. ........... 96200331

[51] Int. Cl.$^6$ ............ H02M 3/335; H02M 3/24; H02M 7/537
[52] U.S. Cl. ............ 363/21; 363/19; 363/97; 363/131
[58] Field of Search ............ 363/18, 19, 20, 363/21, 97, 131

[56] References Cited

U.S. PATENT DOCUMENTS

| | | | |
|---|---|---|---|
| 4,187,536 | 2/1980 | Govaert et al. | 363/21 |
| 4,316,242 | 2/1982 | Colangelo et al. | 363/21 |
| 4,376,263 | 3/1983 | Pittroff et al. | 363/19 |
| 4,464,619 | 8/1984 | Schwarz et al. | 320/40 |
| 4,504,775 | 3/1985 | Becker | 320/32 |
| 4,546,304 | 10/1985 | Schwarz | 323/287 |
| 4,647,833 | 3/1987 | Munnig Schidt et al. | 320/140 |
| 4,652,984 | 3/1987 | Van Der Akker et al. | 363/18 |
| 4,763,061 | 8/1988 | Schwarz | 363/19 |
| 4,764,856 | 8/1988 | Rausch | 363/21 |
| 4,939,632 | 7/1990 | Plagge et al. | 363/19 |
| 4,969,077 | 11/1990 | Plagge | 363/19 |
| 5,404,095 | 4/1995 | Lammers | 323/290 |

FOREIGN PATENT DOCUMENTS

2352828B2  4/1975  Germany.

*Primary Examiner*—Peter S. Wong
*Assistant Examiner*—Bao Q. Vu

[57] ABSTRACT

In a switched-mode power supply a coil is periodically connected across an input voltage by means of a switching element. The switching element is turned off when the voltage across a sensing resistor in series with the switching element exceeds a given threshold. The threshold is reached sooner when the input voltage increases. This effect is compensated by an inductive element in series with the sensing resistor, through which inductive element the same current flows as through the sensing resistor.

19 Claims, 8 Drawing Sheets

SWITCHED-MODE POWER SUPPLY WITH COMPENSATION FOR VARYING INPUT VOLTAGE

BACKGROUND OF THE INVENTION

This invention relates to a switched-mode power supply comprising: a series arrangement of a controllable switching element, an inductive element and a sensing resistor, the series arrangement being arranged to receive an input voltage and to pass a periodically interrupted current in that the controllable switching element is turned on and turned off, and means for turning off the controllable switching element in response to a voltage drop produced across the sensing resistor by the current through the sensing resistor.

Such a switched-mode power supply is known, inter alia, from U.S. Pat. No. 4,939,632. Said power supply is a self-oscillating switched-mode power supply, in which the inductive element is the primary winding of a transformer having its secondary winding connected to a battery to be charged and/or another load via a rectifier diode. The controllable switching element is a bipolar NPN switching transistor having its collector connected to the positive terminal of the input voltage via the primary winding and having its emitter connected to the negative terminal of the input voltage via the sensing resistor. The base of the switching transistor receives drive current via a starting resistor, which results in a current through the switching transistor. The switching transistor is rapidly saturated by means of a positive feedback circuit from the secondary winding to the base of the switching transistor. The current through the switching transistor and, consequently, also through the sensing resistor in series with the emitter increases linearly. When the voltage across the sensing resistor exceeds a given threshold the base of the switching transistor is short-circuited by a second transistor. Thus, the switching transistor is cut off when a certain peak current is reached. During the off-state of the switching transistor the energy stored in the primary winding is transferred to the battery and/or the load via the rectifier diode, which is then conductive. After the current in the secondary winding has decreased to zero a subsequent switching cycle is started automatically.

The time within which the peak current is reached depends on the applied input voltage. In the case of a high input voltage it takes a shorter time to reach the peak current and in the case of a low input voltage it takes a longer time. The frequency of the switching cycle consequently increases as the input voltage increases. Since in each switching cycle the same amount of energy is built up in the primary winding and is transferred to the load, the energy transferred to the load will also increase as the frequency increases. When a battery is charged this means an increase of the average charging current. This situation is undesirable when this type of switched-mode power supply is used in apparatuses with rechargeable batteries which are charged from the rectified mains voltage. The charging time would then be dependent on the local mains voltage. For nevertheless obtaining a constant charging current at different mains voltages a compensation is required which causes the switching transistor to be turned off at a smaller peak current in the case of an increasing mains voltage.

U.S. Pat. No. 4,187,536, particularly FIG. 14 thereof, discloses a solution in which a fraction of the rectified mains voltage is applied to the base of the second transistor by means of a voltage divider. In the case of higher mains voltages the second transistor will sooner be turned on and will sooner turn off the switching transistor. This solution is simple but it entails a substantial dissipation in the voltage divider.

U.S. Pat. No. 4,504,775 discloses a solution in which the pulse voltage across the secondary winding is applied to the base of the second transistor by means of a series resistor, which second transistor has its base-emitter junction arranged in parallel with the sensing resistor. The pulse voltage is proportional to the rectified input voltage across the primary circuit. Although this solution demands less dissipation it is possible only by means of a transformer.

FIG. 1 and FIG. 2 of U.S. Pat. No. 4,464,619 disclose an alternative for the solution of U.S. Pat. No. 4,504,775. In said known switched-mode power supply the sensing resistor is connected to a tapping of the secondary winding of the transformer. However, this solution is limited to configurations in which the primary current also flows through a part of the secondary winding. In this case, an electrical isolation which may be required between the primary and the secondary winding is not possible. The current through the part of the secondary winding is equal to the current through the sensing resistor during turn-on of the switching transistor, but when the switching transistor is turned off a secondary current will flow to the load via the rectifier diode through said part of the secondary winding. The current through the sensing resistor is then zero, i.e. not equal to the current through said part of the secondary winding. Thus, the current through the sensing resistor is not always equal to the current through said part of the secondary winding.

The first-mentioned U.S. Pat. No. 4,939,632 shows in FIG. 4 a first variant with mains voltage compensation based on the rectified voltage, and in FIG. 3 a second variant based on the secondary pulse voltage. However, these variants require more components and the second variant is again possible only by means of a transformer.

SUMMARY OF THE INVENTION

It is an object of the invention to provide a simple solution for the mains voltage compensation. To this end, the switched-mode power supply of the type defined in the opening paragraph is characterized in that a further inductive element is disposed in series with the sensing resistor to generate a voltage which contributes to the voltage drop across the sensing resistor, the current through the further inductive element being always substantially equal to the current through the sensing resistor. The further inductive element in series with the sensing resistor produces a voltage which depends on the current variation per unit of time, which voltage is added to the voltage drop across the sensing resistor. In this way, the switching element is turned off sooner in the case of a higher input voltage.

The further inductive element can be realized in various ways. A further embodiment is characterized in that the further inductive element comprises a coil having a self-inductance. The coil can be a separate coil or can be magnetically coupled to the first-mentioned inductive element. In the last-mentioned case the two inductive elements form a transformer. The voltage across the further inductive element is then proportional to the voltage across the first-mentioned inductive element across which the rectified mains voltage appears. The separate or magnetically coupled coil and the sensing resistor can be combined in a coil having an internal resistance which corresponds to the resistance value of the sensing resistor. The separate coil and the sensing resistor can also be combined in a resistor having an internal self-inductance corresponding to the self-inductance of the coil, for example, a wire-wound resistor having an adequate self-inductance.

A second embodiment is characterized in that the further inductive element comprises: a transistor having a first main electrode connected to a first terminal of the sensing resistor, having a second main electrode and having a control electrode, a further resistor connected between the control electrode and the second main electrode, and a capacitor connected between the control electrode and a second terminal of the sensing resistor.

The time constant of the capacitor and the further resistor is selected in such a manner that in the case of a low input voltage the control electrode of the transistor can follow the voltage variation across the sensing resistor in series with the first main electrode. The transistor then behaves as a diode. However, in the case of a large current increase per unit of time across the sensing resistor the voltage on the control electrode will lag behind the voltage variation across the sensing resistor. The voltage across the main current path of the transistor then increases, as a result of which the overall voltage drop increases. Consequently, the switched element is turned off sooner in the case of a higher input voltage.

The invention is suitable not only for switched-mode power supplies having a transformer coupling to the load to be powered but also for types having a single choke.

BRIEF DESCRIPTION OF THE DRAWING

These and other aspects of the invention will be described and elucidated with reference to the accompanying drawings, in which.

In these Figures parts having the same function or purpose bear the same reference symbols.

DESCRIPTION OF THE PREFERRED EMBODIMENTS

Figure 1:
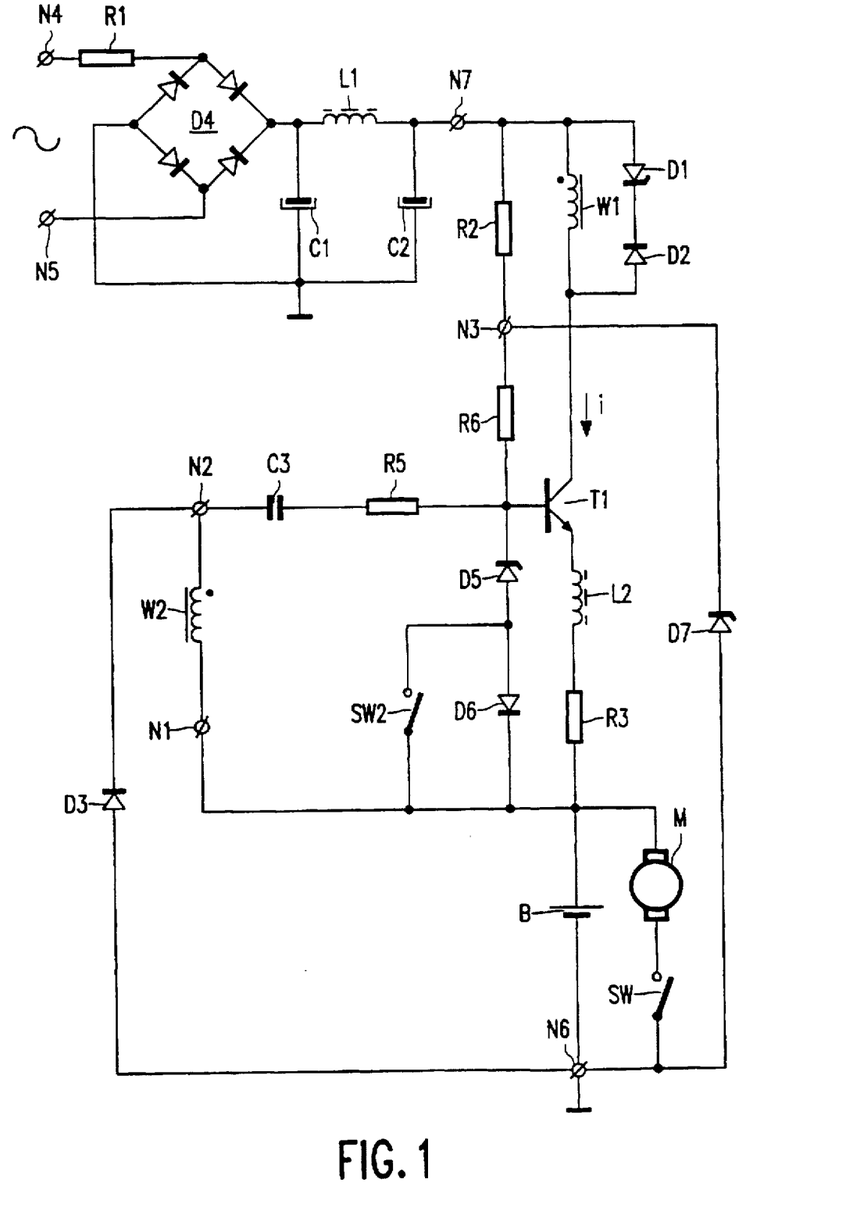
FIG. 1 shows an embodiment of a switched-mode power supply in accordance with the invention.

FIG. 1 shows a circuit diagram of an embodiment of a switched-mode power supply in accordance with the invention. The alternating mains voltage or a suitable direct voltage is applied to the input terminals N4 and N5. If desired, the mains voltage can be applied via a transformer (not shown). The alternating voltage is rectified by means of a diode bridge D4 and is smoothed and filtered by means of capacitors C1 and C2 and a coil L1. Instead of a diode bridge it is also possible to use a single rectifier diode. An optional resistor R1 limits the current through the diode bridge D4. The negative terminal of the rectified input voltage is connected to ground. The positive terminal N7 is connected to a primary winding W1 of a transformer. A zener diode D1 and a diode D2 are arranged in parallel with the primary winding W1 and limit the voltage across the primary winding W1 when the current through the primary winding W1 is interrupted. Instead of the zener diode D1 and the diode D2 shown herein alternative circuits can be used, for example a series arrangement of a capacitor and a resistor, to stabilize the voltage variation across the primary winding W1. The main current path of a switching transistor T1, comprising a bipolar NPN transistor, is connected in series with the primary winding W1, which transistor has its second main electrode or collector coupled to the primary winding W1. The first main electrode or emitter of the switching transistor T1 is connected to a first terminal N1 of a secondary winding W2 of the transformer via a self-inductance L2 and a sensing resistor R3, which secondary winding is magnetically coupled to the primary winding W1. The secondary winding W2 also has its first terminal N1 connected to a load to be powered, which is for example a rechargeable battery B. The positive terminal of the battery B is connected to the first terminal N1. The negative terminal of the battery B is connected to a terminal N6, which is connected to a second terminal N2 of the secondary winding W2 via a diode D3. The terminal N6 is, for example, connected to ground. As a result of this, not only the current through the secondary winding but also the current through the primary winding flows through the battery B. If this is not desirable, the first terminal N1, instead of the terminal N6, may be connected to ground. It is to be noted that the current through the self-inductance L2 is zero if a current flows in the secondary circuit. The self-inductance L2 does not form a part of the secondary winding W2. The control electrode or base of the switching transistor is connected to a supply terminal N3 via a resistor R6. This supply terminal can be connected directly to the positive terminal N7, but the voltage on the supply terminal N3 can also be stabilized, for example, by a zener diode D7 connected between the supply terminal N3 and the terminal N6 (ground) and by a supply resistor R2 between the supply terminal N3 and the positive terminal N7. A series arrangement of a capacitor C3 and a resistor R5 is connected between the base of the switching transistor T1 and the second terminal N2 of the secondary winding W2. Furthermore, the switching transistor T1 has its base connected to the first terminal N1 via a threshold element comprising a zener diode D5 in series with a diode D6, which conducts when the zener diode D5 breaks down. FIG. 1 further shows a motor M, which can be connected to the battery B by means of a switch SW. The motor M can be, for example, the motor of a shaver with rechargeable batteries which are charged from the mains voltage.

When the input voltage is received a starting current will flow from the supply terminal N3, via the resistor R6, to the base of the switching transistor T1, which is consequently turned on. The forward interval or forward phase begins. Now a current starts to flow from the positive terminal N7 to the terminal N6 via the primary winding W1, the switching transistor T1, the self-inductance L2, the sensing resistor R3 and the battery B. The voltage difference across the primary winding W1 induces a transformed voltage difference across the secondary winding W2, the second terminal N2 then being positive relative to the first terminal N1. The cathode of the diode D3 is then positive relative to the anode of the diode D3, as a result of which the diode D3 is cut off. The positive voltage difference across the secondary winding W2 has a positive-feedback effect and drives the base-emitter junction of the switching transistor T1 further into conduction via the capacitor C3, the drive current being limited by the resistor R5. The switching transistor T1 is bottomed and an increasing current i begins to flow through the primary winding W1. This increasing current i produces an increasing voltage drop across the self-inductance L2 and the sensing resistor R3. When the sum of the base-emitter-junction voltage of the switching transistor T1 and the voltage drop across the self-inductance L2 and the sensing resistor R3 is equal to the sum of the zener voltage of the zener diode D5 and the junction voltage of the diode D6, the base of the switching transistor T1 is short-circuited to the first terminal N1. The switching transistor T1 is consequently turned off and the current through the primary winding W1 is interrupted. Now the flyback interval or flyback phase begins, in which the energy stored in the transformer is transferred to the battery B. The peak current at which the switching transistor T1 is turned off does not depend on the voltage across the battery B, because the threshold element has been arranged in parallel with the base-emitter junction of the switching transistor T1 and the sensing resistor R3. Therefore, a short-circuited battery B or another load can never result in an excessive peak current through the switching transistor.

The interruption of the current through the primary winding W1 gives rise to a large voltage increase across the primary winding W1, which voltage increase is positive relative to the input voltage on the positive supply terminal N7 and which is limited by the diode D2 and the zener diode D1. As a result of the current interruption, the sign of the voltage across the primary winding W1 and, as a consequence, that of the voltage across the secondary winding W2 is reversed. The second terminal N2 of the secondary winding W2 is now negative relative to the first terminal N1. The diode D3 now conducts and a secondary current flows in the secondary circuit formed by the secondary winding W2, the diode D3 and the battery B, the energy in the transformer being transferred to the battery. The secondary current decreases to zero. As long as the diode D3 conducts, the negative voltage across the secondary winding W2 is equal to the sum of the voltage across the diode D3 and the voltage of the battery B. The negative voltage transient across the secondary winding W2 appears across the capacitor C3 and keeps the base of the switching transistor T1 negative relative to the emitter. The diode D6 prevents the capacitor C3 from being discharged via the zener diode D5, which is now poled in the forward direction. The switching transistor T1 will now remain cut off until the capacitor C3 has been recharged via the resistors R6 and R5 to such an extent that the voltage on the base of the switching transistor T1 is again sufficiently positive relative to the emitter and a new oscillation cycle is started. As a result of this, the switched-mode power supply is self-oscillating.

The time necessary to charge the capacitor C3, and hence the repetition frequency of the oscillation cycle, is mainly determined by the resistance of the resistor R6 because in practice the resistance of the resistor R5 is negligible. The switched-mode power supply waits until the capacitor C3 has been recharged sufficiently via the resistor R6. Thus, the flyback interval is followed by a waiting interval. A substantially fixed amount of energy is transferred to the battery B or to another load in each oscillation cycle. The repetition frequency of the oscillation cycle consequently determines the average charging current which flows into the battery B. The average charging current can be fixed by an appropriate choice of the resistance of the resistor R6. The switched-mode power supply shown in FIG. 1 is particularly suitable as a slow charger or trickle charger for rechargeable batteries. This is because the diode D6 inhibits rapid charging of the capacitor C3. However, the presence of this diode D6 also enables the switched-mode power supply to be switchable between a comparatively high repetition frequency and a comparatively low repetition frequency. By short-circuiting the diode D6 the negative voltage transient across the capacitor C3 can be compensated rapidly in the flyback interval because the zener diode D5 then operates as a diode poled in the forward direction. As a result of this, the base voltage of the switching transistor T1 more rapidly assumes the positive value which is adequate to drive the switching transistor T1 into conduction again. The repetition frequency of the oscillation cycle then becomes substantially higher, as a result of which the average value of the current supplied to the battery B or another load increases. By means of a switch SW2 across the diode D6 it is thus possible to change over from slow charging to rapid charging of the battery B. The switch can be a hand-operated electrical switch or a transistor switch.

The time within which the peak current is reached depends on the applied input voltage. In the case of a high input voltage it takes a shorter time to reach the peak current and in the case of a low input voltage it takes a longer time. The frequency of the switching cycle consequently increases as the input voltage increases. Since in each switching cycle the same amount of energy is built up in the primary winding and is transferred to the load, the energy transferred to the load will also increase as the frequency increases. When a battery is charged this means an increase of the average charging current. This situation is undesirable when this type of switched-mode power supply is used in apparatuses with rechargeable batteries which are charged from the rectified mains voltage. The charging time would then be dependent on the local mains voltage. For nevertheless obtaining a constant charging current at different mains voltages a compensation is required which causes the switching transistor to be turned off at a smaller peak current in the case of an increasing mains voltage. The self-inductance L2 in series with the sensing resistor R3 produces a voltage which depends on the current variation per unit of time (di/dt) of the current i, which voltage is added to the voltage drop across the sensing resistor R3. In this way, the switching element is turned off sooner in the case of a higher input voltage.

If desired, the self-inductance L2 and the sensing resistor R3 can be united in a wire-wound resistor having an adequate self-inductance or in a coil having an adequate internal resistance.

Figure 2:
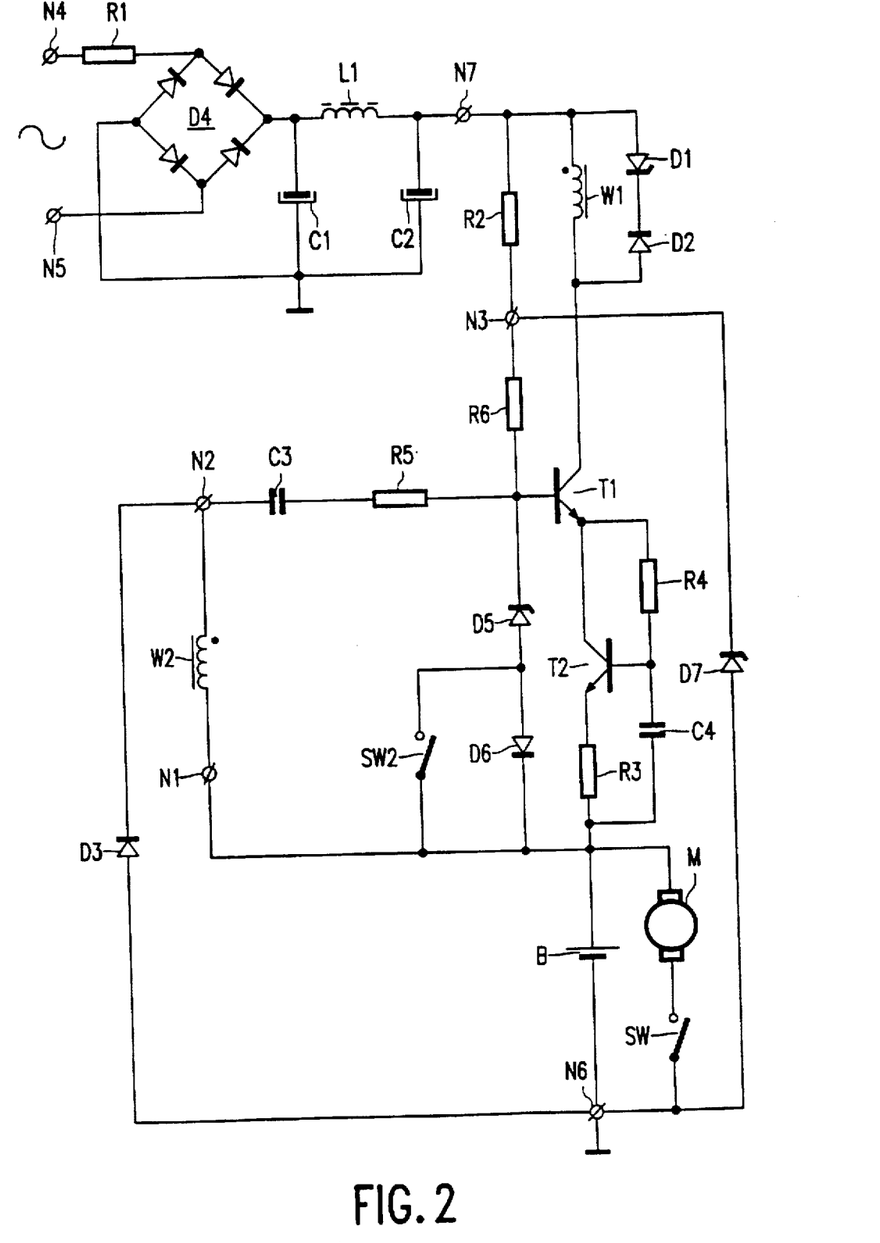
FIG. 2 shows an embodiment of a switched-mode power supply in accordance with the invention.

Instead of the self-inductance L2 another inductive element can be used. FIG. 2 shows an embodiment in which the self-inductance L2 has been replaced by an NPN transistor T2 having its collector connected to the emitter of the switching transistor T1, having its emitter connected to the sensing resistor R3, and having its base connected to the collector of the transistor T2 via a resistor R4. A capacitor C4 is connected across the series arrangement of the base-emitter junction of the transistor T2 and the sensing resistor R3. The time constant of the RC network comprising the resistor R4 and the capacitor C4 has been selected in a manner such that the voltage on the base of the transistor T2 tracks the voltage across the sensing resistor R3 in the case of a low input voltage. The transistor T2 then behaves as a diode. In the case of a large current variation per unit of time (di/dt) the voltage on the base of the transistor T2 will lag behind the voltage on the emitter of the transistor T2. As a result of this, the collector-emitter voltage of the transistor T2 will increase, causing the switching transistor T1 to be turned off sooner.

Figure 3:
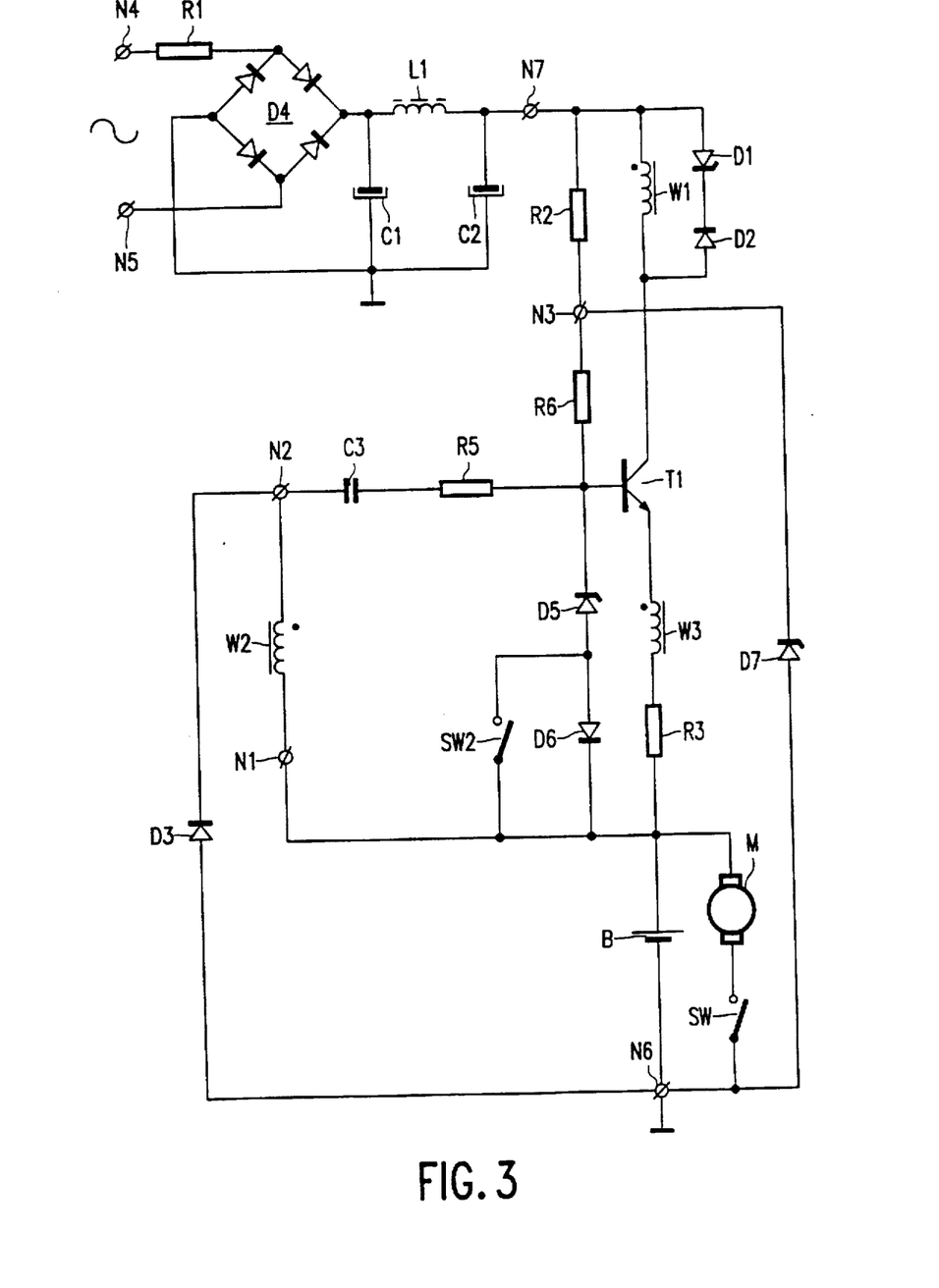
FIG. 3 shows an embodiment of a switched-mode power supply in accordance with the invention.

FIG. 3 shows another alternative for the self-inductance L2. In the present embodiment the self-inductance L2 is a winding W3 of the transformer, which winding is magnetically coupled to the primary winding W1. The voltage across the winding W3, just like the voltage across the primary winding W1, is proportional to the input voltage. In the case of a higher input voltage the voltage across the winding W3 increases, as a result of which the switching transistor T1 is turned off sooner. It is to be noted that the current through the winding W3 is always substantially equal to the current through the switching transistor T1, both in the on-state and in the off-state of the switching transistor T1. The winding W3 does not form part of the secondary winding W2.

Figure 4:
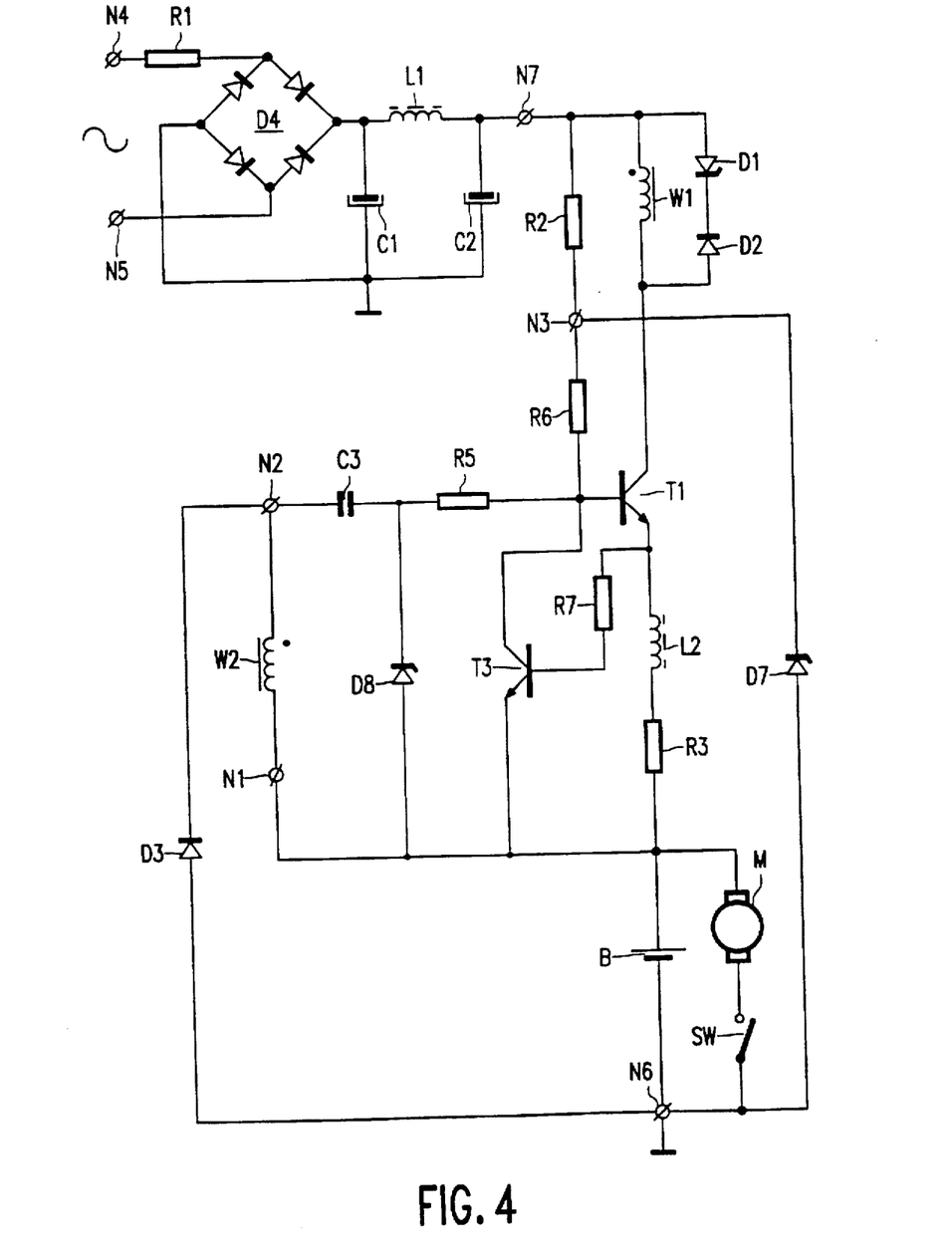
FIG. 4 shows an embodiment of a switched-mode power supply in accordance with the invention.

FIG. 4 shows an embodiment in which, in contradistinction to the embodiment shown in FIG. 1, the base of the switching transistor T1 is not connected to the terminal N1 by means of a zener diode, but to an NPN transistor T3 having its collector connected to the base of the switching transistor T1, having its emitter connected to the terminal N1, and having its base connected to the emitter of the switching transistor T1 via a resistor R7. The increasing voltage drop across the self-inductance L2 and the sensing resistor R3 drives the transistor T3 into conduction, as a result of which the switching transistor T1 is turned off. A zener diode can be arranged in series with or in place of the resistor R7, in order to shift the turn-off level. If desired, the emitter of the transistor T3 may be connected to ground or to another suitable reference point via a zener diode. The node between the capacitor C3 and the resistor R5 can further be connected to the terminal N1 via an optional zener diode D8 or a normal diode. In that case both the zener diode D8 or the normal diode provide a fast discharge path for the capacitor C3 and the switched-mode power supply behaves as a rapid charger. When a zener diode D8 is used, the voltage on the base of the switching transistor T1 when the transistor T1 is turned on is limited. This prevents, in the case of an increasing input voltage over saturation of the switching transistor T1 as a result of an increase in the voltage fed back across the secondary winding. Owing to the storage effect which then occurs, an increasing saturation of the switching transistor T1 would result in an increasing later turn-off of the switching transistor T1 and in an increase of the peak current.

In the same way as shown for the embodiments of FIG. 2 and FIG. 3, the self-inductance L2 in the embodiment shown in FIG. 4 can be replaced by a transistor T2 with a resistor R4 and a capacitor C4 or by a winding W3 which is magnetically coupled to the primary winding W2.

Figure 5:
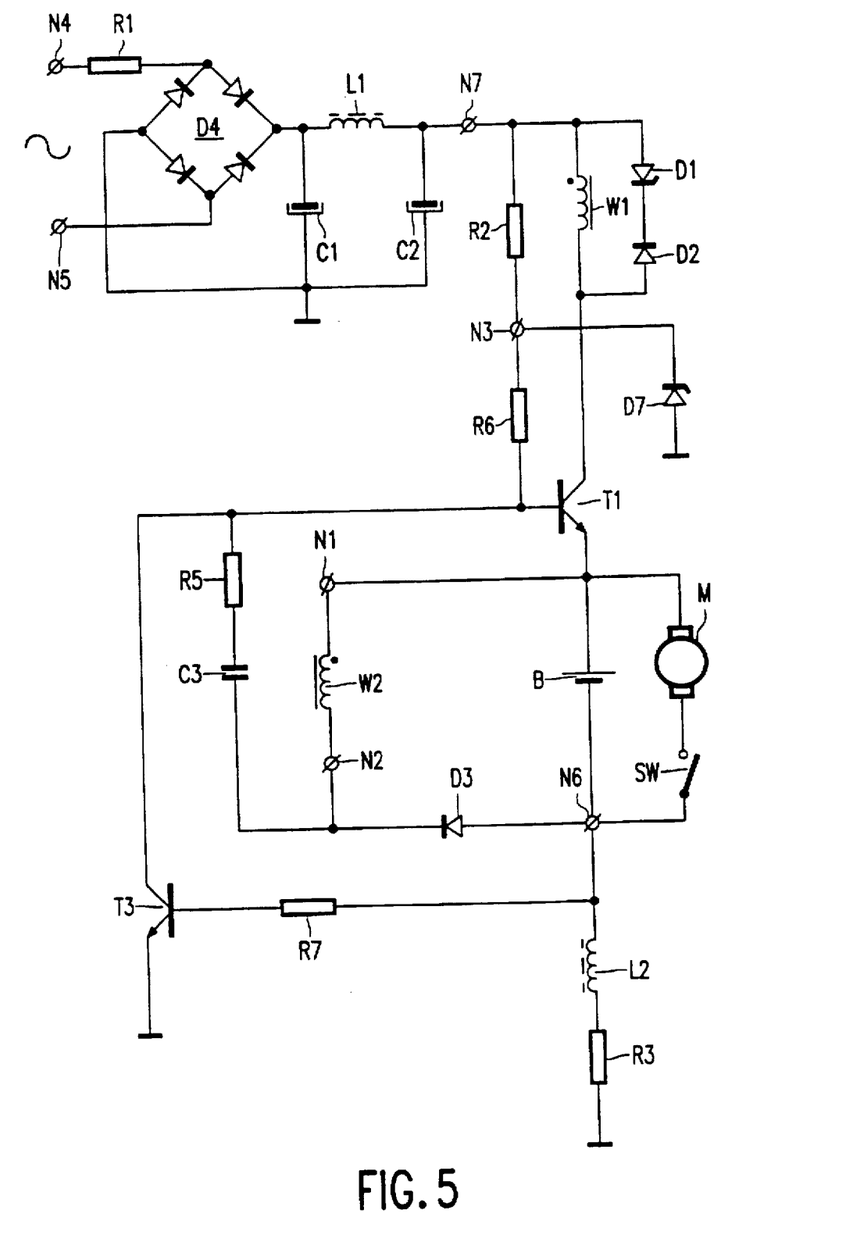
FIG. 5 shows an embodiment of a switched-mode power supply in accordance with the invention.

FIG. 5 shows an embodiment in which, in contradistinction to the embodiment shown in FIG. 4, the terminal N6 is connected to ground via the self-inductance L2 and the sensing resistor R3, the terminal N1 is connected to the emitter of the switching transistor T1, and the emitter of the transistor T3 is connected to ground. However, the operation of this embodiment is basically identical to that in FIG. 4. In the same way as shown for the embodiments of FIG. 2 and FIG. 3, the self-inductance L2 can again be replaced by a transistor T2 with a resistor R4 and a capacitor C4 or by a winding W3 which is magnetically coupled to the primary winding W2.

Figure 6:
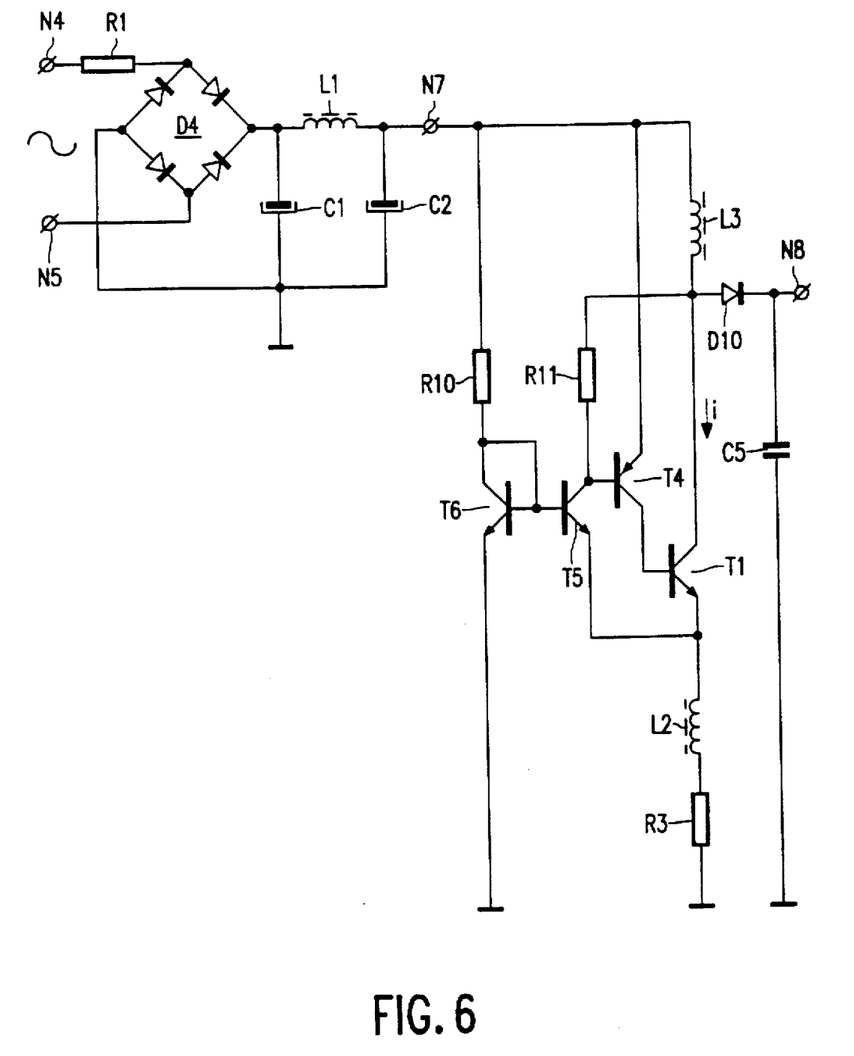
FIG. 6 shows an embodiment of a switched-mode power supply in accordance with the invention.

FIG. 6 shows an embodiment which, apart from the self-inductance L2, is known from Auslegeschrift DT 23 52 828 B2. A series arrangement of a self-inductance L3, an NPN switching transistor T1, a self-inductance L2 and a sensing resistor R3 is connected between the positive supply terminal N7 and ground, the collector of the switching transistor T1 being connected to the self-inductance L3 and the emitter being connected to the self-inductance L2. The base of the switching transistor T1 receives drive current from the collector of a PNP transistor T4, which has its emitter connected to the positive supply terminal N7. The base of the transistor T4 is driven by the collector of an NPN transistor T5, which has its emitter connected to the emitter of the switching transistor T1 and which has its collector connected to the collector of the switching transistor T1 via a resistor R11. The base of the transistor T5 is connected to the base of a diode-connected NPN transistor T6, whose emitter is connected to ground and whose collector is connected to the positive supply terminal N7 via a resistor R10. The node between the collector of the switching transistor T1 and the self-inductance L3 is connected to a supply terminal N8 via a diode D10, which supply terminal N8 is grounded via a smoothing capacitor C5.

The transistor T6 turns on the transistor T5, as a result of which a voltage drop is produced across the resistor R11. As a result of this, the transistor T4 is turned on and this transistor then turns on the switching transistor T1. The current i through the self-inductance L3 now increases until the voltage drop across the self-inductance L2 and the sensing resistor R3 has become so large that the transistor T5 is cut off. The current in the self-inductance L3 then flows from the supply terminal N8 through the diode D10 to the smoothing capacitor C5 and the load (not shown). As soon as the diode D10 is cut off current can flow again to the resistor R11 and the transistor T6 again turns on the transistor T5, and the cycle repeats itself. The self-inductance L2 again compensates for the increasing di/dt in the case of an increasing input voltage. In the same way as shown for the embodiments of FIG. 2 and FIG. 3, the self-inductance L2 in the embodiment shown in FIG. 6 can be replaced by a transistor T2 with a resistor R4 and a capacitor C4 or by a coil which is magnetically coupled to the self-inductance L3.

Figure 7:
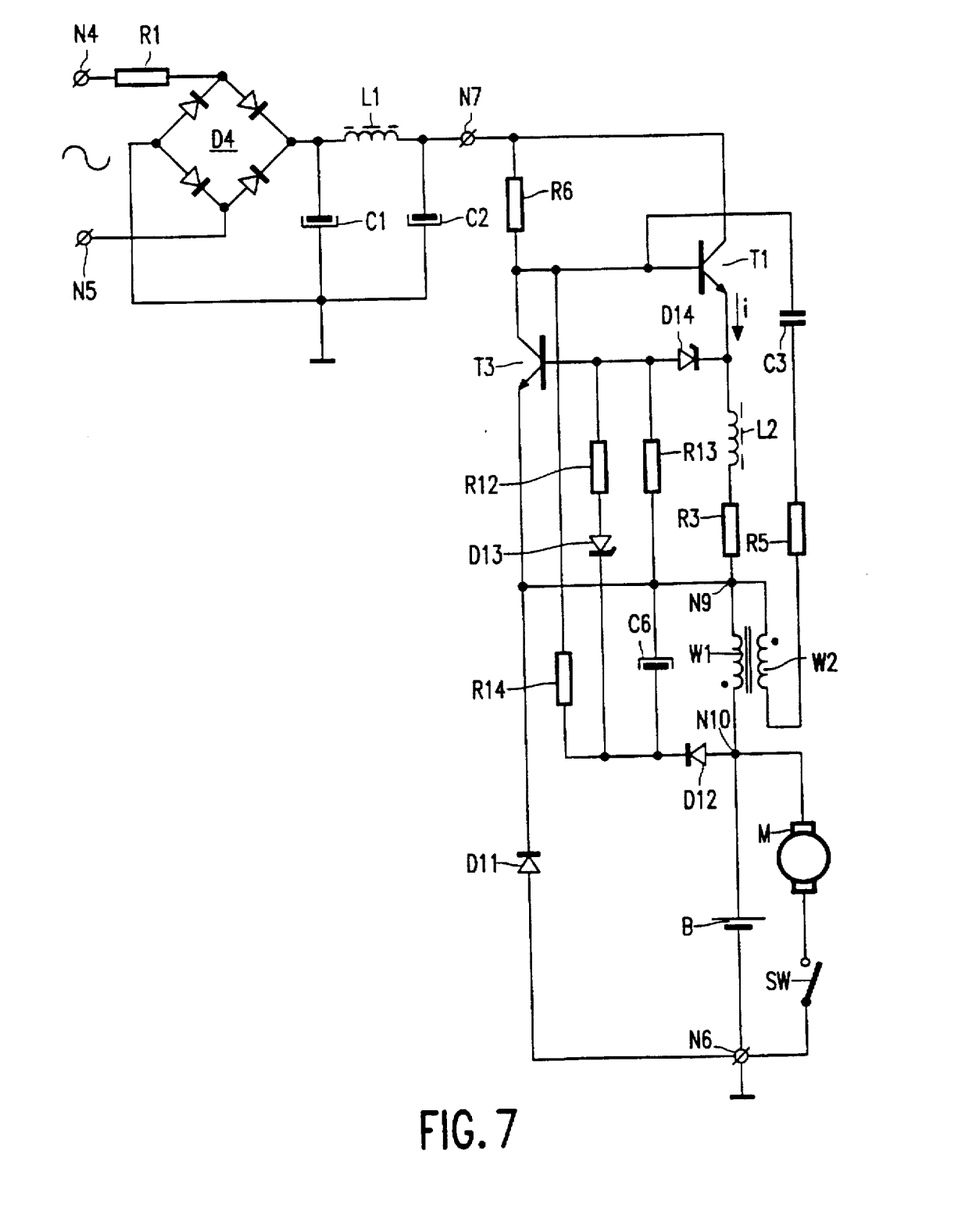
FIG. 7 shows an embodiment of a switched-mode power supply in accordance with the invention.

FIG. 7 shows an embodiment which, apart from the self-inductance L2, is known from U.S. Pat. No. 4,546,304. The alternating mains voltage or a suitable direct voltage is applied to the input terminals N4 and N5. If desired, the alternating mains voltage may be applied via a transformer (not shown) for a better matching to the voltage of the load to be powered. The alternating voltage is rectified by means of the diode bridge D4 and is smoothed and filtered by means of the capacitors C1 and C2 and the coil L1. The negative terminal of the rectified input voltage is grounded. Arranged between the positive supply terminal N7 and ground is a series arrangement of a switching transistor T1, a self-inductance L2, a sensing resistor R3, a primary winding W1 of a transformer, and a load, which is again represented as a rechargeable battery B parallel to a motor M with a switch SW. One terminal of a secondary winding W2 of the transformer is connected to the node N9 between the sensing resistor R3 and the primary winding W1, the other terminal of the secondary winding W2 being connected to the base of the switching transistor T1 via a series arrangement of a capacitor C3 and a resistor R5 to provide positive feedback. The base of the switching transistor T1 is connected to the positive supply terminal N7 via a resistor R6. The node N9 is connected to the cathode of a freewheel diode D11, which has its anode connected to ground. The base of the switching transistor T1 is connected to the node N9 via the collector-emitter path of an NPN transistor T3. The base of the transistor T3 is connected to the node between the emitter of the switching transistor T1 and the series-connected self-inductance L2 and the sensing resistor R3 via a zener diode D14. Furthermore, the base of the transistor T3 is connected to the node N9 by a resistor R13. The node N10 between the battery B and the primary winding W1 is connected to the anode of a diode D12, which has its cathode connected to a smoothing capacitor C6, which is connected between the cathode of the diode D12 and the node N9. The base of the transistor T3 is connected to the cathode of the diode D12 via a series arrangement of a resistor R12 and a zener diode D13, which cathode is further connected to the base of the switching transistor T1 by a resistor R14.

Switching transistor T1 is started by means of resistor R6. A current i starts to flow through the series arrangement of the switching transistor T1, the self-inductance L2, the sensing resistor R3, the primary winding W1 and the battery B. As a result of positive feedback via the capacitor C3 and the resistor R5 the switching transistor T1 is rapidly driven into full conduction and a linearly increasing current i begins to flow through the above-mentioned series arrangement. The freewheel diode D11 is then cut off. At a given value of the voltage drop across the self-inductance L2 and the sensing resistor R3 the zener diode D14 breaks down and the transistor T3 is turned on, as a result of which the switching transistor T1 is turned off. The current i then takes a path through the freewheel diode D11, which then conducts until the current through the winding W1 has become zero. After this, the cycle repeats itself. The switched-mode power supply is self-oscillating. The capacitor C6 is charged to approximately the battery voltage via the diode D12. The zener diode D13 breaks down when a given battery voltage is reached and turns on the transistor T3, as a result of which the oscillation is stopped until the battery voltage has decreased far enough. The average charging current is proportional to the oscillation frequency, which as already explained hereinbefore, depends on the applied input voltage. The self-inductance L2 compensates for this. In the same way as shown for the embodiments of FIG. 2 and FIG. 3, the self-inductance L2 in the embodiment shown in FIG. 7 can again be replaced by a transistor T2 with a resistor R4 and a capacitor C4 or by a coil which is magnetically coupled to the winding W1.

From the embodiments shown it is apparent that it is possible to include an inductive element in series with the sensing resistor in a multitude of configurations of switched-mode power supplies where the main switching transistor can be turned off in response to the voltage drop across the sensing resistor. Therefore, the invention is not limited to the examples of switched-mode power supplies of this type disclosed herein.

The embodiments disclosed herein employ bipolar transistors. However, it is also possible to use unipolar (MOS) transistors of corresponding conductivity types, the first main electrode, the second main electrode and the control electrode corresponding to the source, the drain and the gate of a unipolar transistor.

Figure 8:
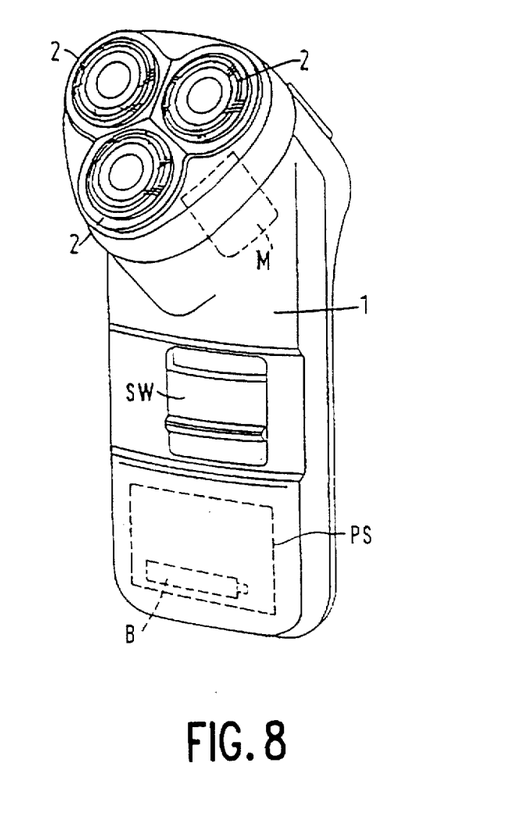
FIG. 8 shows an electric shaver comprising a switched-mode power supply in accordance with the invention.

FIG. 8 shows an electric shaver having a housing 1, which accommodates the switched-mode power supply PS, the rechargeable battery B and the motor M. The motor drives the shaver heads 2 and is operated by means of the switch SW. The switched-mode power supply is of a type as described hereinbefore and comprises the described mains voltage compensation. As a result of this, the apparatus is better suitable for use with fluctuating mains voltages because the charging current of the battery is less dependent upon the applied rectified mains voltage.

We claim:

1. A switched-mode power supply comprising: a series arrangement of a controllable switching element, an inductive element and a sensing resistor, means coupling the series arrangement so as to receive an input voltage and to pass a periodically interrupted current by turning the controllable switching element is on and off, means for turning off the controllable switching element in response to a voltage drop produced across the sensing resistor by the current through the sensing resistor, and a further inductive element coupled in series with the sensing resistor so as to generate a voltage which contributes to the voltage drop across the sensing resistor, the current through the further inductive element being always substantially equal to the current through the sensing resistor.

2. A switched-mode power supply as claimed in claim 1, wherein the further inductive element comprises a coil having a self-inductance.

3. A switched-mode power supply as claimed in claim 2, wherein the coil (W3) is magnetically coupled to the inductive element.

4. A switched-mode power supply as claimed in claim 2 wherein the coil and the sensing resistor have been combined to form a coil having an internal resistance which corresponds to the resistance of the sensing resistor.

5. A switched-mode power supply as claimed in claim 2, wherein the coil and the sensing resistor have been combined to form a resistor having an internal self-inductance which corresponds to the self-inductance of the coil.

6. A switched-mode power supply as claimed in claim 1, wherein the further inductive element comprises: a transistor having a first main electrode connected to a first terminal of the sensing resistor, having a second main electrode and having a control electrode, a further resistor connected between the control electrode and the second main electrode of the transistor, and a capacitor connected between the control electrode of the transistor and a second terminal of the sensing resistor.

7. An electric shaver comprising: a rechargeable battery, an electric motor, a switch for connecting the motor to the battery, and a switched-mode power supply as claimed in claim 1 and coupled to the battery and motor for powering at least the battery and/or the motor.

8. A switched-mode power supply as claimed in claim 3 wherein the coil and the sensing resistor have been combined to form a coil having an internal resistance which corresponds to the resistance of the sensing resistor.

9. A self-oscillating switched mode power supply comprising:

a pair of input terminals for connection to a source of supply voltage for the switched mode power supply, a series circuit including a controllable switching means, an inductive element and a sensing resistor coupled to said pair of input terminals, a positive feedback circuit coupled to a control electrode of the controllable switching means and responsive to a current flowing in said series circuit for driving said controllable switching means into conduction, a further inductive element connected in series with the sensing resistor so as to produce a voltage which adds to the voltage drop across the sensing resistor, wherein the current flow through the further inductive element is equal to the current flow through the sensing resistor, and means responsive to the combined voltage across the sensing resistor and the further inductive element for turning off conduction through the controllable switching means.

10. The self-oscillating switched mode power supply as claimed in claim 9 further comprising:

a rechargeable battery connected in series with said series circuit, wherein said means for turning off conduction includes a zener diode coupled to the control electrode of the controllable switching means, and the positive feedback circuit includes a second inductive element magnetically coupled to said inductive element and electrically coupled to the control electrode of the controllable switching means.

11. The self-oscillating switched mode power supply as claimed in claim 9 wherein said further inductive element is magnetically coupled to said inductive element.

12. The self-oscillating switched mode power supply as claimed in claim 9 wherein said further inductive element comprises:

a transistor connected in series between the controllable switching means and the sensing resistor, a capacitor coupled across a series circuit of the base/emitter junction of the transistor and the sensing resistor, and a resistor coupled across the base/collector junction of the transistor.

13. The self-oscillating switched mode power supply as claimed in claim 9 wherein the positive feedback circuit includes a second inductive element magnetically coupled to said inductive element and electrically coupled to the control electrode of the controllable switching means, and said means for turning off conduction includes a voltage threshold device coupled to the control electrode of the controllable switching means so as to produce a defined voltage level at which the controllable switching means is turned off.

14. The self-oscillating switched mode power supply as claimed in claim 9 wherein said means for turning off conduction includes a transistor coupled to the control electrode of the controllable switching means and having a control electrode coupled to a junction point in said series circuit between the controllable switching means and the further inductive element.

15. The self-oscillating switched mode power supply as claimed in claim 14 further comprising a voltage threshold element coupled to the control electrode of the controllable switching means so as to limit the voltage on said control electrode during turn-on of the controllable switching means.

16. The self-oscillating switched mode power supply as claimed in claim 9 further comprising:

a rechargeable battery connected in said series circuit, wherein the series circuit comprises, in the order named, the inductive element, the controllable switching means, the battery, the further inductive element and the sensing resistor coupled to said pair of input terminals, a transistor coupled to the control electrode of the controllable switching means and with its control electrode coupled to a junction point between the battery and the further inductive element, and wherein the positive feedback circuit includes a second inductive element magnetically coupled to said inductive element and electrically coupled to the control electrode of the controllable switching means.

17. The self-oscillating switched mode power supply as claimed in claim 9 wherein the positive feedback circuit comprises:

a first transistor coupled between one input terminal and the control electrode of the controllable switching means and with its control electrode coupled to a junction point between the inductive element and the controllable switching means, a second transistor coupled across the controllable switching means and to the control electrode of the first transistor, and a diode-connected third transistor coupled to the input terminals and to the control electrode of the second transistor.

18. The self-oscillating switched mode power supply as claimed in claim 9 wherein said input terminals are connected to a source of low frequency AC supply voltage via a diode bridge circuit.

19. The self-oscillating switched mode power supply as claimed in claim 9 wherein the positive feedback circuit includes a second inductive element magnetically coupled to said inductive element and electrically coupled to the control electrode of the controllable switching means, and further comprising a diode coupled to a load circuit and to a terminal of the second inductive element and polarized so that it will conduct when the controllable switching means is turned off, thereby to provide a path for current flow via the second inductive element and the load circuit.

* * * * *